Feb. 19, 1952 J. SWANBERG 2,586,186
SPOON BAIT
Filed March 18, 1948
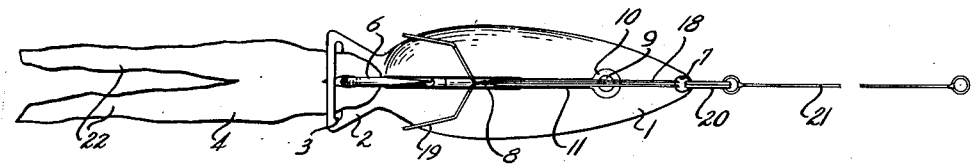
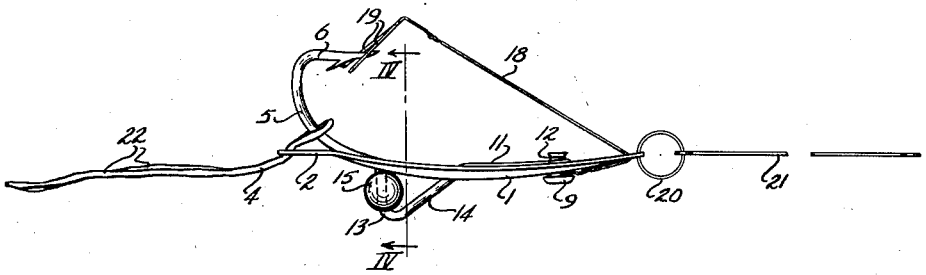
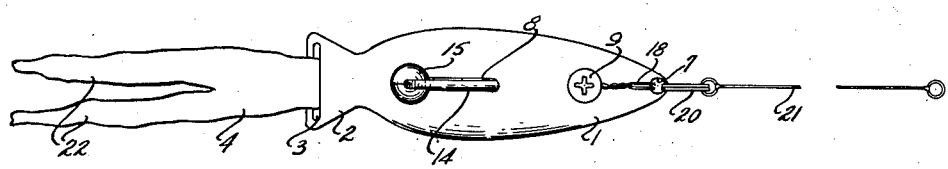
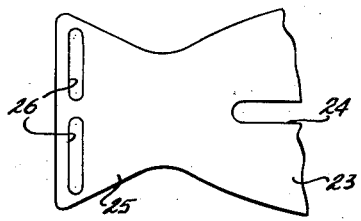
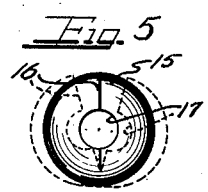
Inventor
JULIUS SWANBERG Patented Feb. 19, 1952

2,586,186

UNITED STATES PATENT OFFICE 2,586,186

SPOON BAIT

Julius Swanberg, Chicago, Ill.

Application March 18, 1948, Serial No. 15,690

8 Claims. (Cl. 43—42.52)

This invention relates to an improved type of fish bait or lure and more particularly to a spoon bait, of the weedless type, adapted to be advanced with a transverse swinging or oscillating movement about the hook point as a fulcrum. The improved action of the spoon bait is made possible by a unique construction of the hook which is formed with an integral keel-like portion, a part of which acts as a weed guard for a stabilizing ball supported on another portion of the keel to lock the hook on the spoon. The tail portion of the spoon is novel in that it is constructed with a slotted tail piece adapted to serve as a lock for a pork rind strip engaged on the hook.

It is an object of this invention to provide an improved type of fish bait of simple and improved construction wherein a controlled oscillating movement of the spoon is accomplished by means of a pendulum ball which also serves to lock the hook firmly to the spoon thereby eliminating any possibility of the spoon turning over or spinning when the spoon bait is used with or without a pork rind strip.

It is also an object of this invention to provide a metal fish bait including a spoon the tail portion of which is so constructed that it affords a lock for a pork rind strip engaged on the hook.

Still another object of the invention is to provide a metal spoon bait wherein the hook portion is constructed and equipped to serve as a controlling medium for the oscillating movement of the bait about the hook point as a fulcrum when the spoon bait is drawn through water.

A further object of the invention is to provide a metal fish bait constructed with a spoon body having a hook member supported thereon and projecting therethrough, with the projecting portion serving as a weed guard for a pendulum and hook locking member which functions to control the oscillating motion of the bait when drawn through water.

Still another object of the invention is to provide a spoon bait, of novel and improved construction, wherein the hook point or barb is adapted to remain substantially stationary to serve as the center or fulcrum about which a combination hook lock and control oscillates when the spoon bait is drawn through water.

Still another object of the invention is to provide a spoon bait wherein the hook member is provided with a weed guard and has an intermediate portion thereof projected through a slot in the spoon to serve as a keel member for carrying a stabilizing ball which locks the hook on the spoon and is protected against the accumulation of weeds thereon by a portion of the hook beneath the spoon.

It is an important obect of this invention to provide a fish bait, preferably constructed of metal, and including a longitudinally disposed keel-like weed guard for carrying a stabilizing member which controls the oscillating movement of the spoon bait when pulled through the water and which prevents the spoon bait from tipping over or spinning when in use.

Another important object of the invention is the provision of a spoon bait including an interfitting spoon and hook, wherein the spoon is provided with a pork rind lock, while the hook is provided with a stabilizing member and control which is protected by a weed guard forming part of the hook.

Other and further important objects and features of this invention will be apparent from the disclosures in the specification and the accompanying drawings.

On the drawings:

Figure 1 is a top plan view of an improved spoon bait embodying the principles of this invention;

Figure 2 is a side elevation of the spoon bait illustrating the hook lock and stabilizer ball engaged on the weed guard keel forming part of the hook, and also illustrating a pork rind strip engaged on the hook and projecting through the slot lock provided in the spoon tail;

Figure 3 is a bottom plan view of the spoon bait;

Figure 4 is a transverse detail section taken on line IV—IV of Figure 2 looking toward the tail end of the spoon bait;

Figure 5 is an enlarged top plan view of the pendulum or stabilizing ball in closed position and illustrating the open position of the ball in dotted lines; and Figure 6 is a fragmentary top plan view of a modified form of bait spoon with double lure locking slots in the tail piece of the spoon.

As shown on the drawings:

This invention is directed to an improved type of fish bait or lure preferably made entirely of metal and also adapted to be constructed of other selected materials if desired. Substantially all of the present types of spoon baits, of either the open or weedless types, are all likely to turn over or spin when used either with or without pork rind strips. The present invention, on the other hand, is directed to a spoon bait which is preferably constructed of metal having the tail piece slotted to provide a pork rind strip lock, while the body portion of the spoon is slotted to permit an intermediate portion of the hook stem or shank to be deflected through the spoon body to provide a weed guard keel for supporting a ball, which not only acts as a hook lock but also serves as a stabilizing medium for controlling the arc of oscillation of the spoon bait about the hook point as a fulcrum.

The improved spoon bait is preferably constructed of metal and comprises a spoon body 1 constructed of a single piece of metal, of suitable gauge, having integrally formed on one end thereof a dove-tail shaped tail piece 2 formed with a transverse slot lock 3 to serve as a medium for locking a pork rind strip 4 against accidental disengagement from the bight portion 5 of a fish hook 6. The pork rind strip has the head or mounting end thereof provided with a longitudinal slit or cut sufficiently long to permit easy engagement over the pointed barb end of the hook without any danger of the pork rind becoming accidentally disengaged from the spoon bait due to the provision of the slotted tail lock on the spoon.

The spoon body 1 is of concave-convex construction and substantially oval in shape terminating at one end in the tail piece 2 while the head end of the spoon body is of tapered narrow construction and is provided with an aperture 7. The spoon body is also provided with a longitudinal hook slot 8, centrally positioned in the hook body and aligned with the end aperture 7. Also provided in the spoon body between the hook slot 8 and the aperture 7 is an intermediate aperture in which a screw stud or rivet 9 fits. The rivet 9 serves as a front hook lock and engages through an eye 10 of the hook shank or stem 11. The rivet 9 projects upwardly through the intermediate opening of the spoon body 1 and passes through the hook eye 10 and through a washer 12. The rivet 9 thus acts as a means for rigidly locking or securing the eye end of the fish hook shank in position on the concave surface of the spoon body 1. The shank of the hook is positioned centrally and longitudinally on top of the spoon body 1 so that the bight portion 5 of the hook projects upwardly at right angle to the spoon body over the inner end of the tail piece 2 as clearly illustrated in the drawings.

Integrally formed intermediate the ends of the stem of the fish hook, by deflecting and bending a portion of the fish hook shank, is a keel portion consisting of a stem section 13 which is deflected substantially at right angles to the front portion of the hook shank and has the lower end thereof integrally connected with an inclined keel weed guard section 14. The keel portion 13—14 projects downwardly through the longitudinal slot 8 in the spoon body 1 and serves as a keel for the spoon bait.

For the purpose of providing a second and rear lock for rigidly locking or securing the fish hook unit to the spoon body 1, a split pendulum or stabilizing ball 15 is rigidly clamped on the stem section 13 of the keel and tightly fits against the under surface of the spoon body 1 and against the lower curved portion of the keel weed guard section 14 as clearly illustrated in Figure 2. The stabilizer ball is preferably constructed of solid copper or other suitable material that is formed with a diametric slot 16 which extends slightly beyond the axis of the ball and which is formed with two opposite semi-cylindrical or rounded grooves 17 adapted to tightly fit around the keel stem section 13 when the ball is clamped into position around the stem section 13 to close the slot 16, as shown in full lines in Figure 5. The pendulum or stabilizer ball 15 may be colored a bright red or any other attractive color.

The pendulum or stabilizer ball 15 not only serves as a lock for the fish hook, but also fulfills a second important mission which is that of a pendulum ball for imparting a rapid, controlled transverse oscillating movement to the spoon as the spoon bait is drawn through the water. The keel and the ball carried thereon act to eliminate the possibility of the spoon turning over or spinning either with or without the use of pork ring strip. The controlled action of the spoon bait, resulting from the use of the keel and the ball, causes the barb and the hook point 6 at all times to ride in an upright and practically straight line movement since the hook point or barb becomes the center or fulcrum about which the ball oscillates and controls the rapid transverse oscillation of the spoon.

The improved construction of the spoon bait assures weedless performance since the inclined section 14 of the keel unit acts as a weed guard for the ball 15. The weedless performance of the improved spoon bait is also accomplished by means of a main weed guard 18 constructed of double wires the mounting ends of which project downwardly through the spoon opening or aperture 7 and project rearwardly to tightly engage around the hook lock rivet 9. The upper ends of the main weed guard wires are separated and shaped to provide hook-shaped guards 19 which are positioned on opposite sides of the barb and hook point 6 to guard the same.

Also engaged through the spoon aperture 7 is a split ring 20 to which one end of a wire leader 21 is adapted to be engaged. The ring 20 serves as a means for helping the spoon ride or climb over logs, lily pads and other obstructions.

The spoon bait is adapted to use any suitable type of strip but is more particularly designed to accommodate a pork rind strip 4 formed with a head portion having a longitudinally directed slit therein, of sufficient length to permit the head portion of the strip when projected through the tail slot 3 to be easily engaged over the barb point 6 and then be pulled downwardly onto the bight portion 5 of the hook member. The trailing end of the pork rind strip is preferably cut to provide two or more tails or legs 22, as illustrated in Figure 2. The slot lock 3 in the tail piece 2 of the spoon serves as a means for locking the head or mounting end of the pork rind strip against accidental removal from the hook. The slotted tail portion of the spoon also serves as a means for holding the trailing end of the pork rind strip positioned to increase the activity of the legs 22 with the transverse oscillation of the spoon body, when the spoon bait is drawn through the water and oscillates through a prescribed arc controlled by the action of the lock and stabilizing ball 15 carried on the keel portion of the hook stem or shank.

In the performance of the improved spoon bait the substantially straight line movement of the hook point 6 as the remainder of the spoon bait is caused to oscillate transversely, together with the fact that the hook point 6 is substantially above or aligned with the control ball 15 greatly aids in driving the hook point home.

Figure 6 illustrates a modified form of spoon adapted for use in large sized spoon baits. The modified form of spoon consists of a spoon body 23 having a longitudinal center slot 24 and an integral tail piece 25 provided with two spaced transversely aligned slots 26 to permit a pair of pork rind strips to be lockingly engaged through the slots 26 and then engaged over the barb and the hook point 6 and onto the hook bight portion 5 similar to the arrangement illustrated in Figure 2.

The improved spoon bait of this invention is adapted to accomplish improved results by embodying the use of an improved fish hook, the stem or shank portion of which is bent or deflected to form an angular portion or keel which is adapted to project through a slot in a spoon. The deflected portion of the fish hook shank not only serves as a keel for the spoon but also acts as a support for a pendulum and stabilizer ball. The ball also functions as a secondary lock for securing the hook in position with respect to the spoon after the eye end of the hook shank is riveted or otherwise rigidly secured to the forward portion of the spoon. The keel together with the lock ball serves as a means for controlling the transverse oscillation of the spoon bait about the barb point of the fish hook as a fulcrum point. The keel portion of the hook together with the control ball carried thereby control the oscillating movement of the spoon thereby greatly increasing the action of the spoon bait, and at the same time serves to prevent the turning over or spinning of the spoon bait when it is drawn through the water. The improved spoon bait is provided with upper and lower weed guards, thus assuring weedless performance. A further important feature of the improved spoon bait is the double locking arrangement for securing the fish hook to the spoon.

A further improvement in the spoon bait is the construction of the slotted tail piece whereby a pork rind strip or the like may be locked or secured in place against loss or accidental disengagement. The pork rind strip is thus securely mounted at the rear end of the spoon to which the liveliest oscillations are imparted when the spoon bait is in action, thereby resulting in a most vigorous action being imparted to the pork rind strip and the legs forming a part thereof.

The improved spoon bait may be constructed of different kinds of metal for adapting the bait for different kinds of fish. The bait may be constructed out of brass to provide a sinking bait, or out of aluminum to produce a floating bait. If preferred, the bait may be constructed of stainless steel for salt water fishing.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A spoon bait comprising a spoon body having a longitudinal center slot therein, a tail piece integrally formed on one end of the spoon body and having a slot therein for receiving a pork rind strip therethrough, a fish hook seated in the spoon body having one end riveted thereto and the opposite point carrying end disposed above the tail piece to receive one end of the pork rind strip engaged thereon, said hook having a portion of the shank deflected to form a triangular keel section projecting through the spoon body slot, and a stabilizer ball engaged on the keel section to assist in locking the hook in place and serve as a stabilizer for controlling the transverse oscillation of the spoon bait.

2. A spoon bait comprising a spoon body having a longitudinal center slot therein, a tail piece integrally formed on one end of the spoon body and having a transverse slot therein for receiving one end of a pork rind strip engaged therethrough, a fish hook seated in the spoon body and having one end riveted thereto, said hook having a portion of the shank deflected to form a triangular keel section projecting through the spoon body slot, said hook having the barb carrying bight portion thereof disposed in the central longitudinal plane of the spoon bait above the tail piece and adapted to have a slotted end of the pork rind strip engaged thereover to hold the pork rind strip locked against accidental removal from the spoon bait, a control ball secured on a portion of the keel section at the hook to assist in holding the hook locked in position on the spoon body and also serve as a stabilizer for controlling the transverse oscillation of the spoon bait about the hook barb as a fulcrum point when the spoon bait is drawn through water, and a weed guard secured to the spoon body for protecting the fish hook barb point.

3. A spoon bait comprising a slotted spoon body, a hook disposed longitudinally of the spoon body, a rivet for securing one end of the hook to the spoon body, said hook having a portion of the shank thereof deflected at an angle to project through the slotted spoon body, and a split locking member engaged on the deflected portion of the hook below the spoon body to assist in holding the hook locked in position, said portion of the hook which projects through the spoon body including a weed guard member for preventing weeds from gathering on the locking member.

4. A fish bait including a spoon body formed of sheet material, said body having a longitudinal central slot therein and a pair of spaced apertures aligned with said slot, a fish hook having both ends seated upon the top of said body and having a portion of the hook shank deflected to form an angular portion projecting through the body slot to serve as a keel, said fish hook having an eye thereof secured to the body by a rivet projecting through one of the body apertures and through the fish hook eye, and a weed guard projecting through the other of said body apertures and having one end thereof secured to said rivet, said weed guard projecting upwardly into a position to guard the point of the fish hook.

5. A fish bait comprising a sheet metal spoon body having a central longitudinal slot therein and an aperture aligned with said slot, a fish hook having both ends seated upon the top face of the spoon body and having its eye registering with the aperture in said body, securing means engaged through the body aperture and through the eye of the fish hook for rigidly securing the fish hook to said body, a keel forming an integral angular part of the fish hook shank and projecting through the body slot, and a split ball engaged on the keel below the body to assist in locking the hook in position and act as a stabilizer for the bait when same is in use.

6. A fish bait comprising a sheet metal spoon body having a longitudinal slot therein and an aperture aligned with said slot, a fish hook longitudinally disposed upon the top of said body and having the eye thereof in register with the body aperture, fastening means engaged through the fish hook eye and through the body aperture for securing one end of the fish hook in place, a weed guard secured to the fastening means and projecting upwardly through the body aperture into a position to permit the upper end thereof to serve as a guard for the fish hook point, a keel member integrally formed out of a deflected portion of the hook shank and projecting through the body slot, and a split ball engaged on the keel member below the spoon body for also locking the hook to the body member and serving as a stabilizer for controlling the transverse oscillation of the bait when drawn through the water.

7. A spoon bait comprising a spoon body having a longitudinal central slot therein, a hook secured to the body and having a looped portion thereof projecting through the body slot to serve as a keel for the spoon bait, and a ball member engaged on the looped portion of the hook and against the bottom of the spoon body to control the transverse oscillation of the spoon bait about the fish hook point as a fulcrum when the spoon bait is drawn through the water.

8. A spoon bait comprising a spoon body, a fish hook engaged on the spoon body, a rivet and a ball member for securing the fish hook to the spoon bait, said ball member serving as a stabilizer for controlling the transverse oscillation of the spoon bait when drawn through the water, a weed guard for the ball member formed out of a deflected portion of the fish hook shank projecting through the spoon body, and a second weed guard carried by the spoon body for protecting the point of the fish hook.

JULIUS SWANBERG.

REFERENCES CITED

The following references are of record in the file of this patent:

UNITED STATES PATENTS

| Number | Name | Date |
|---|---|---|
| 1,546,105 | Powell | July 14, 1925 |
| 1,638,215 | Rodgers | Aug. 9, 1927 |
| 1,742,786 | Roberts | Jan. 7, 1930 |
| 1,750,783 | Pemberton | Mar. 18, 1930 |
| 1,789,630 | Knight | Jan. 20, 1931 |
| 1,939,291 | Buddle | Dec. 12, 1933 |
| 2,167,163 | Toepper | July 25, 1939 |
| 2,206,486 | Nelson | July 2, 1940 |
| 2,214,409 | Eaby | Sept. 10, 1940 |